Sept. 25, 1945.　　　L. H. GAUDREAU　　　2,385,354
FIXTURE
Filed April 13, 1943
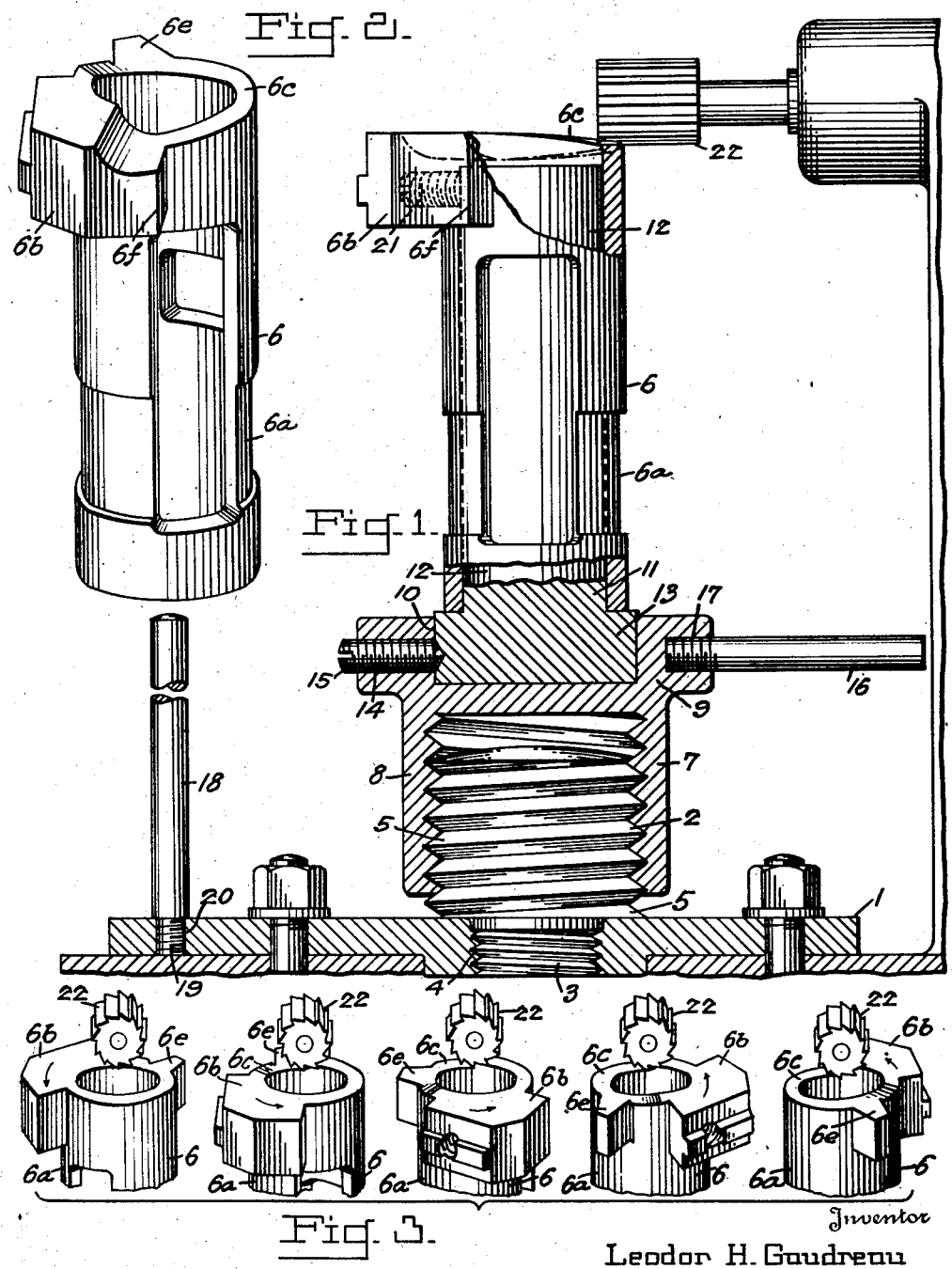
Inventor
Leodor H. Gaudreau Patented Sept. 25, 1945

2,385,354

UNITED STATES PATENT OFFICE 2,385,354

FIXTURE

Leodor H. Gaudreau, Ludlow, Mass.

Application April 13, 1943, Serial No. 482,864

1 Claim. (Cl. 90—13)

(Granted under the act of March 3, 1883, as amended April 30, 1928; 370 O. G. 757)

The invention described herein may be manufactured and used by or for the Government for governmental purposes, without the payment to be of any royalty thereon.

This invention relates to a fixture for forming a helical surface particularly on a cutting tool.

Forming a helical cam surface on the end of a cutting tool with conventional machinery and fixtures is a time-consuming difficult procedure. Furthermore, after rough machining such helical cam surface the cutting tool is generally heat treated and it is then necessary to grind this surface to produce a smoothly finished cam surface. While this grinding may be accomplished in the lathe by using a tool post grinder, this procedure is also inconvenient because the lathe has to be started and stopped with each revolution.

Accordingly, it is an object of this invention to provide an improved fixture permitting the rapid production of a helical surface, particularly on the end of a cutting tool, by milling and grinding.

The specific nature of the invention as well as other objects and advantages thereof will clearly appear from a description of a preferred embodiment as shown in the accompanying drawing in which:

Fig. 1 is a cross sectional view of the grinding fixture mounted on the bed of a milling machine with the cutting tool supported by the fixture showing the cam surface being formed on the top of the cutting tool.

Fig. 2 is a perspective view of the cutting tool.

Fig. 3 is a view showing the development of the helical cam surface on the top of the cutting tool as cut by the milling machine cutter.

There is shown in Fig. 1 in assembled relation a fixture for milling and grinding a helical cam surface on the end of a cutting tool. On a suitable base 1 there is provided a threaded post 2. The post 2 is secured to the base 1 by a downwardly projecting threaded portion 3 which engages a suitably threaded hole 4 in the base 1. On the exterior surface of the post 2 there are provided threads 5. The pitch of threads 5 conforms to the lead of the helical cam surface to be formed on the end of a cutting tool 6. A tool post holder or support member 7 comprising a tubular body 8 and an integral hub 9 is threadably mounted on post 2. On the upper surface of the hub 9 there is provided an axial hole 10 to receive a tool post 11. The tool post 11 comprises a cylindrical body 12 and one end 13 of somewhat larger diameter than the body portion 12. The end 13 snugly fits within the hole 10 provided in the hub 9 of tool post holder 7. A set screw 15 provided in a suitably threaded radial hole 14 passes through hub 9 into the hole 10 and bears against the end 13 of tool post 11 thereby securing it to tool post holder 7.

A rod-like arm 16 is threadably secured within a radial hole 17 provided in the hub 9 of tool post holder 7. The arm 16 projects outwardly from the hub 9 so that it will strike a stop 18 when the arm 16 is revolved about the post 2. The stop 18 may be a rod-like member provided with an end portion 19 of slightly reduced diameter and suitably threaded for vertical mounting in a threaded hole 20 in base 1. The cutting tool 6 of the type on which the helical cam surface is to be formed is shown in Fig. 1 and comprises a tubular body 6a, two integral lugs 6b and 6e and a helical cam surface 6c provided on the end of the tool 6. The edges 6d and 6f of lug 6b form the cutting edges of tool 6. The cutting tool 6 is secured to the tool post 11 by a set screw 21.

The helical cam surface 6c on the end of tool 6 is preferably initially cut in a milling machine. The tool 6 is first securely fastened to tool post 11 by the set screw 21. The tool post holder 7 should then be fully screwed on the threaded post 2 and then backed off several threads in order to insure that tool post holder 7 will not strike the top of post 2 as the tool post holder 7 is rotated approximately one revolution about post 2. The fixture is then suitably secured to the bed of the milling machine after properly positioning cutting tool 6 under the milling machine cutter 22. The helical cam surface 6c on cutter 6 is then formed by rotating tool 6 underneath milling machine cutter 22 by turning arm 16 in a counterclockwise direction as viewed in Fig. 1. This movement will raise the tool 6 up against the cutter 22 provided the threads on post 2 are right hand threads and will develop a helical surface corresponding to the lead of the pitch of the threads provided on post 2. As previously mentioned, the cam surface provided on the end of tool 6 is formed on a helical lead in approximately one complete revolution, thus when the arm 16 strikes the stop 18 after the start of the formation of the cam surface the tool cutter will have been rotated nearly one complete revolution. It should be understood that the helical cam surface 6c on tool 6 may be readily varied by employing other posts and tool post holders with varying pitches of thread corresponding to the helical leads desired.

The cam surface formed by machining as described above is then ground to a smooth finish preferably after the tool 6 has been properly heat treated. The cutting tool is again placed over tool post 11 and is secured to the hub 9 as previously described. The fixture may then be placed on the bed of a conventional surface grinder and the helical cam surface 6c then ground to a smooth finish in much the same manner as described for rough machining of this surface.

If so desired and especially in cases where the inside diameter of the body portion 6a of tool 6 is not held to very close tolerances, the tool post 11 may be permanently secured to the hub 9 of tool post holder 7 with an integral tool post holder and tool post. However where the inside diameter of the body portion 6a of cutter 6 is changed due to machining operations on this diameter after milling but before grinding of the helical surface, the construction described permits another tool post 11 of appropriate dimension to be fastened to the tool post holder 7 which will hold the cutter 6 during the grinding operation.

I claim:

A fixture for producing a helical surface on the end of a tubular member comprising a base, a threaded post member secured to said base, a support member having a cylindrical portion constructed to be insertable within the tubular member, means for securing the tubular member to said cylindrical portion, a threaded portion on said support member coaxial with said cylindrical portion and engaging said threaded post member, the lead of said threads corresponding to the lead of the desired helical surface, means for rotating said support member with respect to said base whereby the end of the tubular member may be helically advanced with respect to a cutting tool, and means for limiting the rotation of said support member with respect to said base to substantially one turn.

LEODOR H. GAUDREAU.